United States Patent Office 3,359,832
Patented Dec. 26, 1967

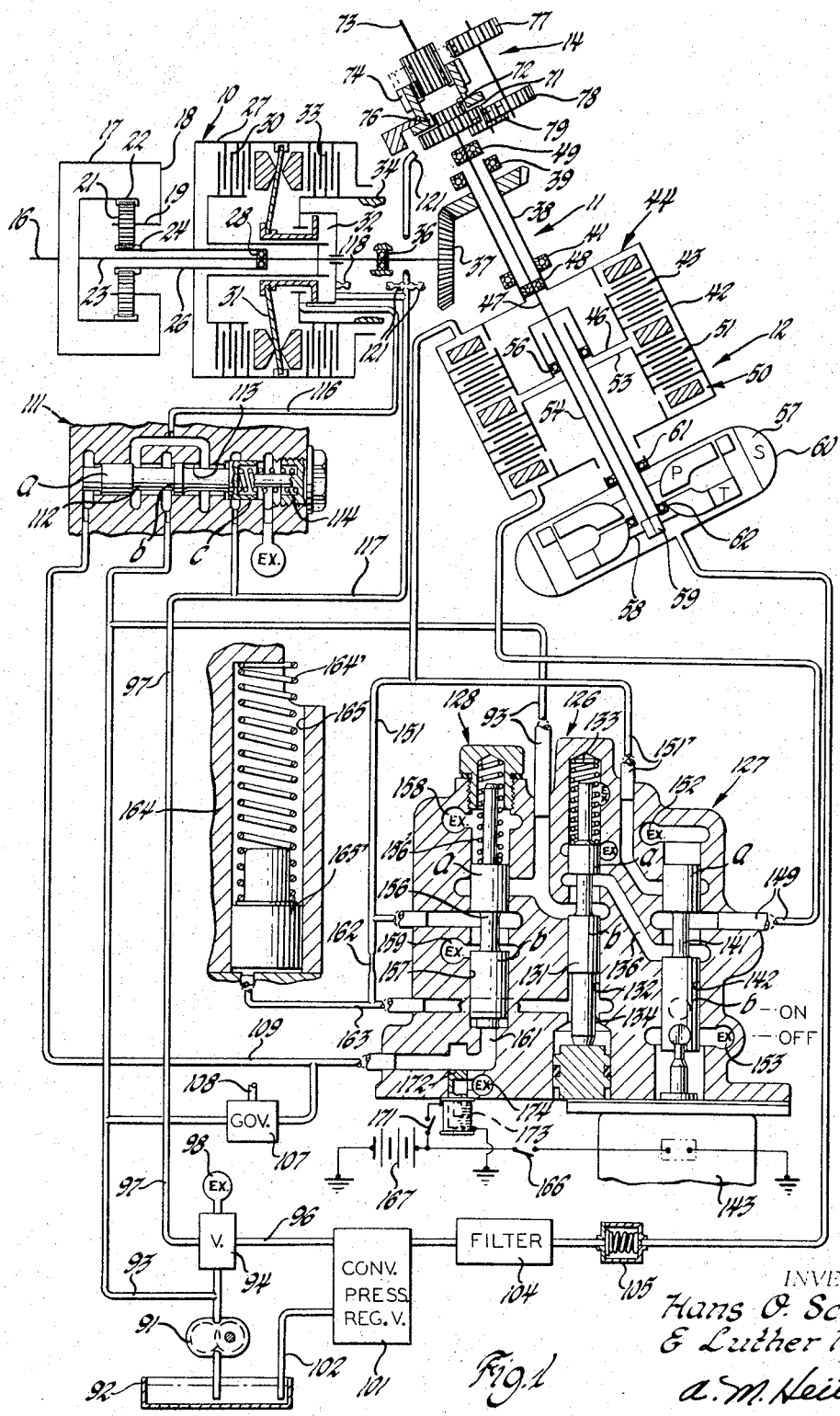

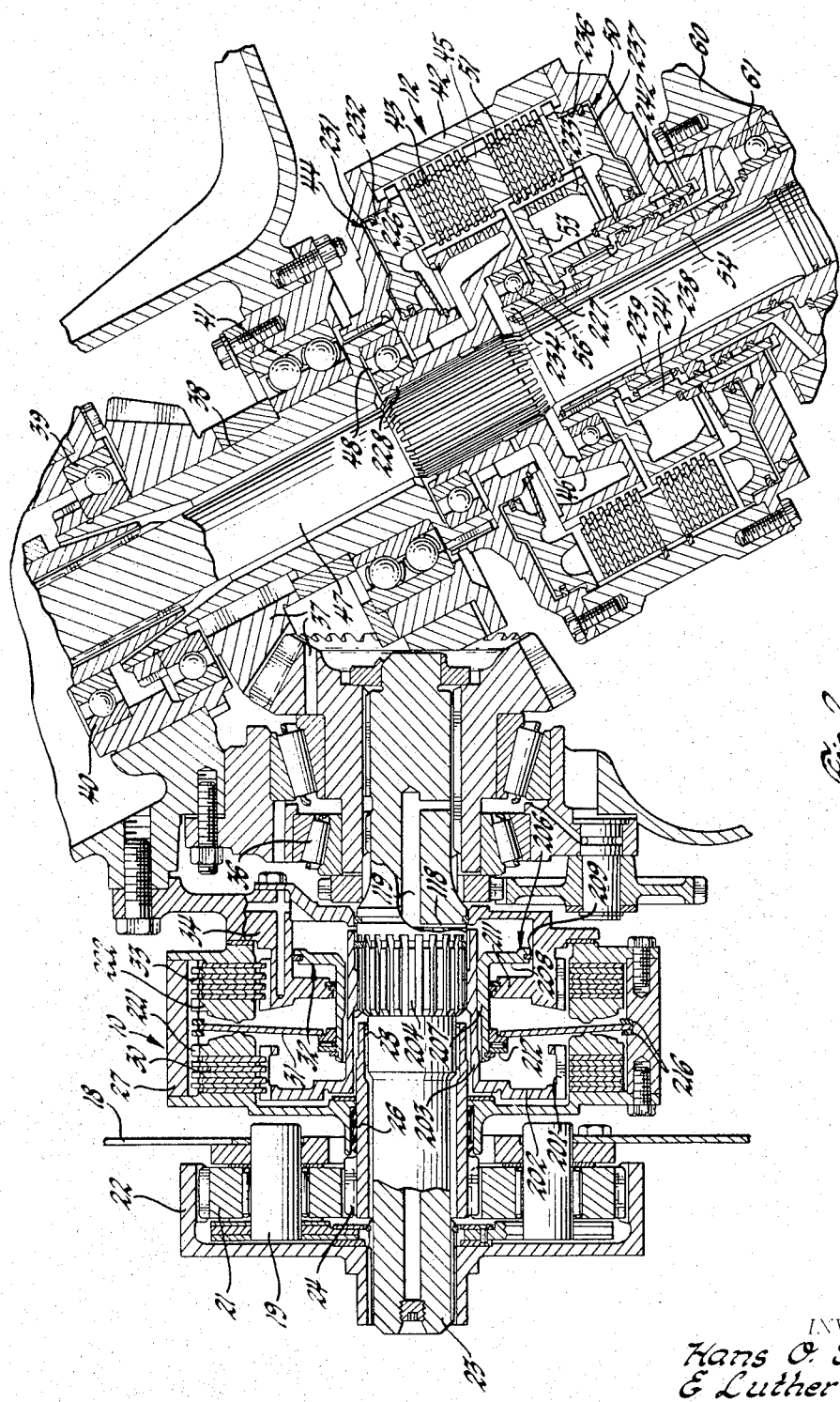

3,359,832
TRANSMISSION
Hans O. Schjolin, Birmingham, and Luther N. Kern, Berkley, Mich., assignors to General Motors Corporation, Detroit, Mich., a corporation of Delaware
Filed Jan. 6, 1966, Ser. No. 519,103
6 Claims. (Cl. 74—781)

This invention relates to transmissions and control systems therefor and particularly to drive controls employing alternatively operable dual friction engaging devices.

The invention is employed in transmissions having a pair of friction torque establishing devices, such as brakes or clutches, which are employed to establish the ratio drives wherein one of the devices is spring applied and a fluid motor is used to release the one device and apply the other device to change the ratio of the drive. In this type of arrangement, where the motor is stationary and the friction torque establishing devices and the spring rotate at times, it is desirable to maintain on the transfer bearing connection between the motor and the spring a sufficient load to insure relative rotation at the bearing and not between other elements of the connection. Thus the motor is constructed to provide in the release position a small residual force acting against the spring to provide this load on the transfer bearing but insufficient to release the spring applied device and apply the fluid applied device. For motor apply, a large fluid force is provided to release the spring applied device and engage the fluid applied device. In the specific embodiment this is accomplished by applying lubricating oil at a low pressure to the apply side of the motor and a reduced lubricating oil pressure to the other side of the motor to provide a small release force sufficient to insure relative rotation at the transfer bearing surface. In order to apply the fluid applied device, the lubricating oil pressure is disconnected from the apply side and a substantially higher line pressure is connected to the apply side to apply the fluid applied device.

An object of the invention is to provide in a transmission having a spring applied and a pressure applied friction torque establishing device and a fluid motor connected through an apply spring by a bearing, the motor providing a small apply force merely to load the bearings sufficiently to provide for rotation at the bearing surfaces and a higher force to release the one device and apply the other device.

Another object of the invention is to provide in a transmission having a Belleville spring applying a first friction torque establishing device and a second friction torque establishing device applied by the Belleville spring when moved to the release position, a fluid motor connected by a thrust transfer bearing to the Belleville spring and controls to supply the constant release fluid pressure to the release chamber of the fluid motor and a slightly higher pressure to the apply chamber of the fluid motor when the spring is engaging the first friction torque establishing device and to apply a high pressure to the apply side of the fluid motor to release the first device and engage the second device.

These and other objects of the invention will be more apparent from the following drawing and description of the preferred embodiment.

FIGURE 1 schematically shows the transmission gearing and control system.

FIGURE 2 shows a portion of the transmission gearing arrangement and the actuating mechanism therefor.

The transmission drive train as illustrated in FIGURE 1 has a two-speed splitter input unit 10, a bevel drive unit 11, a converter drive clutch, direct drive clutch and torque converter assembly 12 and a forward and reverse output drive 14. The input shaft 16, or engine shaft, drives a flywheel 17 which is drivingly connected through the drive plate 18 to drive the carrier 19 which has planetary pinions 21 meshing with the ring gear 22 drivingly connected to the intermediate or splitter output shaft 23 and a sun gear 24 connected to the sun gear sleeve shaft 26. A clutch drum 27 is secured at a middle point to the sleeve 26 so that the center of the drum is substantially concentric with the sleeve shaft bearing 28. The splitter low or direct drive clutch 30, when engaged by the Belleville lever spring 31, when the fluid motor 32 is released, connects the sun gear and the ring gear to lock up the gear unit for direct drive or low. The brake 33, when engaged by motor 32 acting through spring 31, connects the sun gear 24 to the grounded portion or cylinder 34 of motor 32 to retard the sun gear for high or overdrive. The arrangement of these components is described below with reference to FIGURE 2.

The splitter output shaft 23, supported at the rear end by a bearing 36, is connected by the bevel gear unit 37 to drive the angle drive input shaft 38 mounted in bearings 39 and 41 supported on the housing and the converter and direct drive clutch drum 42. The drum 42 is connected by the clutch 43 when engaged by the motor 44 to drive the direct drive hub 46, which drives the intermediate shaft 47, which is supported by a bearing 48 between the sleeve shaft 38 and a rear bearing 49 on the housing. The drum 42 also drives through the converter clutch 51, actuated by motor 50, the converter clutch hub 53 which is splined to the converter input shaft 54 which drives the pump P of the torque converter. The clutches have a common backing plate 45 fixed to drum 42. A bearing 56 between the hubs 46 and 53 supports the end of shaft 54 and locates the direct drive clutch hub. This clutch structure is described in further detail with respect to FIGURE 2.

The torque converter pump P drives fluid in a toroidal path in the operating chamber 57 to drive the turbine $T_1T_2$ which is connected through a hub 58 and a one-way clutch and bearing unit 59 to drive the intermediate shaft 47 in on direction and to support the intermediate shaft. The stator blades S are secured to the fixed housing 60 and provide reaction in the torque converter. The forward or pump end of the pump shaft 54 is supported to the fixed housing by a bearing 61. The bearing 62 supports the turbine assembly on the shaft 54.

The shaft 47 drives the output gear 71 and clutch teeth 72. The output shaft 73 has splined thereon a gear 74 for axial movement so that the clutch teeth 76 engage the clutch teeth 72 for direct drive and the gear 74 engages the gear 77 driven from the reversing idling gears 78–79 to provide reverse drive.

Hydraulic system

The input driven pump 91 draws fluid from a sump 92 located in the base of the transmission housing and supplies fluid to the main line 93 at a pressure regulated by the main line regulator valve 94 which exhausts the normal overage to the converter feed line 96 and the lubrication line 97 and has an exhaust 98. The pressure in the converter feed line is regulated by the converter pressure regulator valve 101 which exhausts the overage via exhaust line 102 to sump. The converter feed line 96 is connected through a filter 104, a check valve 105 for a one-way feed to the converter operating chamber 47. A governor 107 supplied with fluid from the main line 93 is driven through shaft 108 at a speed proportional to the speed of the output shaft 73 and provides in governor line 109 a pressure proportional to vehicle speed or output shaft speed.

A splitter shift valve 111 controls the supply of main line fluid and lubricating fluid to the double acting motor 32 to control the operation of the splitter low and splitter high motors. This value has a valve element 112 having lands *a* and *b* of small diameter and a larger land *c* located in a stepped bore 113 and is biased toward the downshift position by spring 114. In the downshift position the valve 112 connects the lubrication line 97 to the apply line 116. The lubrication line is also connected by branch 117 to the release chamber which has a restricted exhaust 118 to lubrication line 119 (FIG. 2) to continuously vent the release chamber and thus maintain a lower pressure acting on the larger area of the release side of the piston to provide a biasing force to almost balance the higher lubricating pressure acting on the smaller area of the apply side of the piston, but to provide a small residual force to the right in FIGURE 1 or the apply direction which keeps the transfer bearing engaged, so relative movement is between the rollers and races of the thrust bearing 212, FIG. 2, and not between the race and snap ring or the race and the spring. When the speed increases sufficiently to provide a governor pressure to upshift the shift valve, the valve will, in the upshift position, connect main line 93 to apply line 116 to move the motor 32 to engage the high brake. The lubrication branch line 117 has restricted branches 121 to lubricate the splitter gear unit, the bevel gear 37 and the reverse gear unit 14.

The direct drive and converter drive clutches are controlled by a relay valve 126, a manual valve 127 and an automatic shift valve 128. The relay valve 126 has a valve element 131 having lands *a* and *b* of equal diameter located in a bore 132 and biased in the open position by spring 133 and closed when fluid is supplied to the chamber 134. This valve in the open position shown, connects the main line 93 to the transfer passage 136 leading to the manual shift valve 127. The manual shift valve has a valve element 141 having lands *a* and *b* of equal diameter located in the bore 142, and is actuated by a solenoid 143, which in the current off position shown, connects transfer passage 136 to the converter clutch apply line 149, which supplies fluid to the converter drive motor 50 to engage the converter clutch 51. In the solenoid on position, partially shown in the dotted lines, passage 136 is blocked and the converter clutch apply line 149 is connected between the lands to the branch 151' of the direct drive apply line 151. The ends of the bore 142 are vented by exhausts 152 and 153.

The shift valve 128 has a valve element 156 having lines *a* and *b* located in a bore 157 and is biased to the closed or downshift position for converter drive as shown by the spring 156'. The spring chamber end of the bore is vented by exhaust 158 to prevent fluid accumulating and interfering with the action of the valve. With the valve in the downshift position, the direct drive clutch valve line 151 is connected to exhaust 159 disengaging the direct drive clutch to place the transmission in converter drive.

When the pressure in the governor branch line 161, acting on the end of land *b* of valve element 156, increases sufficiently to overcome the biasing force of the spring 156', the valve moves to the upshift position connecting main line 93 to direct drive clutch apply line 151 blocking exhaust 159. The fluid supplied to the direct clutch apply line 151 and motor 44 flows through the restriction 162 to line 163 which is connected to the accumulator 164 and the chamber 134. The pressure in line 163 rises slowly due to the restricted feed and the increasing volume of the accumulator 164 and when it reaches the pressure at which the direct drive clutch 43 is substantially engaged, the pressure in chamber 134 downshifts valve 126 to cut off the supply of main line fluid to transfer passage 136 and the converter apply line 149. The accumulator 164 has a spring 164' in the vented end of bore 165 which biases the piston 165' to the closed end of the bore which is connected to line 163.

For neutral drive, the switch 166 is closed to connect the battery 167 to energize the solenoid 143 to place the valve 127 in the on position where the converter apply line 149 will be connected via the direct drive apply line 151 and branch 157' to exhaust 159 at the shift valve 128. It will be seen that under these conditions, if the vehicle is coasting at a high speed to upshift the shift valve 128, both clutches would be engaged for increased braking. A manual forced downshift is provided by a downshift switch 171 which is closed when the throttle pedal is in the full trottle position to actuate a normally opened valve 172 to block the flow from the governor in line 161 and exhaust line 161 only downstream of the valve 172 via port 173 in the valve to exhaust 174.

The direct drive clutch 30 and overdrive brake 33 are located in the housing or drum 27 as shown in detail in FIGURE 2. The clutch 30 has plates alternately splined to the outer drum 27 and the drum portion 201 of hub 202, which has an inner sleeve 203 splined to the splines 204 on shaft 23. It will be noted that splines 204 are concentrically within the brake 33 and that the sleeve 203 is spaced from the shaft 23 for more than half the length of the drum 27 so that the sun gear sleeve shaft 26 which supports both sun gear 24 and the drum 27 may extend between the sleeve shaft 203 and shaft 23 to a point substantially centrally within the drum 27, where shaft 26 is supported by bearing 28 on shaft 23. The L-shaped piston 206 has a cylindrical portion 207 surrounding sleeve 203 in sealing engagement therewith and an annular portion 208 extending radially nad having its periphery 209 in sealing engagement with the inner cylindrical surface of the fixed cylinder 34. Cylinder 34 also has an inwardly extending annular portion 211 meeting in sealing engagement the outer surface of the sleeve portion 207 of piston 206. Thrust is transferred from piston 206 via the thrust bearing 212 which consists of a pair of plates with needle bearings between the plates. One plate is axially located on the sleeve 207 by suitable means, such as a snap ring, and the other plate bears against the inner perimeter of the Belleville lever spring 31. The outer perimeter of Belleville spring 31 is pivotally mounted on the inner surface of the drum 27 by suitable means, such as snap rings 216. The Belleville spring 31 is formed to normally spring bias pressure plate 221, which has a suitable pivot ring thereon, to engage the plates of the direct drive clutch 30. As explained above, when the spring is in this position, the residual force provided by full lubrication pressure on the apply side and reduced lubrication pressure on the release side engages the thrust bearing just enough so relative movement is between the races and rollers and not between one race and the snap ring or between the other race and the spring. When main line pressure, which is higher than lubrication pressure, is admitted to the fluid motor 32, the piston acts through the thrust bearing to move the Belleville spring to disengage the direct drive clutch and engage the pressure plate 222 at its pivot to engage overdrive brake 33.

The angle drive input shaft 38 drives the converter and lockup clutch drum 42. The clutch 43 has plates alternately splined with the drum 42 and the drum 226 which is mounted on the hub 46. The hub 46 also has a cylindrical portion 227 of intermediate diameter to receive the bearing 56 and a mounting sleeve portion 228 splined to the intermediate shaft 47. The motor 44 has a cylinder 231, formed in the end wall of drum 42, which receives a piston 232. When fluid is supplied to the cylinder 231, the piston 232 engages the clutch 43 to connect the input driven drum 42 via hub 46 to drive the intermediate shaft 47. The converter clutch 51 has alternate plates splined to the drum 42 and the drum 233 of the hub 53. The hub 53 has an inner cylindrical part 234 engaging the inner diameter of bearing 56 and is splined to the pump input shaft 54. The converter drive clutch motor 50 has a cylinder 236, formed in the end wall of drum 42, to receive the piston 237. On the supply of fluid to the cylinder 236 the piston 237 engages the plates to engage clutch 51 for drive from the drum 42 to the torque converter pump shaft 54.

Fixed housing 60 has a sleeve extension 238 extending to the central portion of the drum 42 where it supports a bearing 239, which engages the sleeve 241 which is fixed to the drum 42 to rotatably support the drum 42. The fluid transfer bushing 242 is located between the sleeve 238 and sleeve 241 to transfer both the direct drive clutch supply line and the converter clutch supply line from the fixed housing 60 to the rotating drum 42 for connection to the motors as shown diagrammatically in FIGURE 1. It will be noted that the drum 42 is supported for rotation at each end by bearings 41 and 239 to the fixed housing. The clutch hubs 46 and 53 are aligned and centrally supported within the housing by the single bearing 56 and centrally mounted on shaft 54 which is supported by bearings 48 and 62. Bearing 48 is closely supported by shaft 38 and bearing 41 to the fixed housing. Thus both the hubs are rotatably supported with respect to drum 42 by the bearing 48 which also supports the drum.

We claim:

1. In a transmission, drive means operative to establish a first and a second ratio including a first friction torque establishing means for establishing one ratio and a second friction torque establishing means for establishing a second ratio, means for selectively engaging said first and second friction torque establishing means including spring means rotatable at times and operative to normally engage said first friction torque establishing means to engage said friction torque establishing means and stationary motor means operatively connected to said spring means by a transfer bearing and operatively connected to said second friction torque establishing means, and control means to supply fluid pressure to said motor means to preload said thrust bearing means sufficient to load said transfer bearing for rotation only at the bearing surfaces but insufficient to compress said spring means and in another selective position to supply a pressure to said motor means apply chamber to move said spring means to disengage said first friction torque establishing means and to engage said second friction torque establishing means.

2. The invention defined in claim 1 and said control means supplying a low pressure to said motor means to preload said transfer bearing and a high pressure to move said spring means to disengage said first friction torque establishing means.

3. The invention defined in claim 2 and said motor means having a release chamber continuously supplied with fluid at a lowest pressure and exhausted to cool a friction torque establishing device.

4. The invention defined in claim 1 and said first and second friction torque establishing devices having apply plates located adjacent each other, said spring being a Belleville spring located between said apply plates and normally engaging said first friction torque establishing device.

5. The invention defined in claim 4 and said Belleville spring being annular and said motor having a piston sleeve extending through said annular Belleville spring and said transfer bearing being located between said Belleville spring and a ring secured to the end of said piston sleeve.

6. The invention defined in claim 1 and said drive means having input, output and reaction elements, said first friction torque establishing means being a clutch connecting said output and reaction element and rotating when engaged, said second friction torque establishing means being a brake and connected to said reaction means to hold said reaction means when engaged, said friction torque establishing means having apply plates facing each other, said spring being an annular Belleville spring located between said apply plates and biased to engage said clutch, said motor means having an L-shaped stationary annular cylinder located within said brake and an L-shaped annular piston in said cylinder defining an apply and release chamber having a larger area extending through said spring, and said transfer bearing being located freely between a ring on the end of said piston and said spring on the side remote from said cylinder, said control means including a source of low pressure, a source of high pressure, said source of low pressure being continuously connected to said release chamber, a vent means in said release chamber to cool said brake and to maintain the pressure in said release chamber lower than said low pressure, a shift valve selectively connecting said low pressure to said apply chamber to preload said transfer bearing being just enough to insure relative rotation at the bearing surfaces and not between the races and the ring and spring and connecting said high pressure to said apply chamber to move said spring to release said clutch and apply said brake.

References Cited

UNITED STATES PATENTS

| 3,038,575 | 6/1962 | Hansen | 192—85 |
| 3,090,257 | 5/1963 | Schjolin et al. | 74—781 |
| 3,182,528 | 5/1965 | Lamburn | 192—18 X |

DONLEY J. STOCKING, *Primary Examiner.*

THOMAS C. PERRY, *Examiner.*